United States Patent [19]

Gics

[11] Patent Number: 5,679,109
[45] Date of Patent: Oct. 21, 1997

[54] METHOD OF MAKING A FOOD PACKAGE AND AN ASSOCIATED APPARATUS

[75] Inventor: Paul W. Gics, Sewickley Heights, Pa.

[73] Assignee: Gics & Vermee, L.P., Sewickley, Pa.

[21] Appl. No.: 557,891

[22] Filed: Nov. 14, 1995

Related U.S. Application Data

[60] Division of Ser. No. 340,765, Nov. 16, 1994, which is a continuation-in-part of Ser. No. 298,527, Aug. 30, 1994, Pat. No. 5,492,703.

[51] Int. Cl.$^6$ ............................................. B31B 7/00
[52] U.S. Cl. ..................... 493/100; 156/556; 156/566; 53/175; 53/329.4; 53/449; 53/243; 493/95
[58] Field of Search ............................ 53/250, 175, 559, 53/282, 329.3, 329.4, 170, 171, 449, 243; 493/95, 100, 101; 156/556, 566, 567

[56] References Cited

U.S. PATENT DOCUMENTS

| | | | |
|---|---|---|---|
| 2,615,377 | 10/1952 | Farrell et al. .......................... | 493/95 |
| 3,092,945 | 6/1963 | Wizelman .......................... | 53/329.3 |
| 3,160,326 | 12/1964 | Sturdevant et al. . | |
| 3,298,505 | 1/1967 | Stephenson . | |
| 3,372,856 | 3/1968 | Erhart et al. . | |
| 3,436,894 | 4/1969 | Sorenson . | |
| 3,448,559 | 6/1969 | Bjarno .......................... | 53/170 |
| 3,449,183 | 6/1969 | Zelnick . | |
| 3,458,380 | 7/1969 | Kipp . | |
| 3,495,758 | 2/1970 | Wienecke, Jr. . | |
| 3,567,104 | 3/1971 | Arslanian et al. . | |
| 3,785,544 | 1/1974 | Smith . | |
| 3,863,832 | 2/1975 | Gordon et al. . | |
| 4,200,481 | 4/1980 | Faller .......................... | 53/175 |
| 4,205,750 | 6/1980 | Dews .......................... | 53/449 |
| 4,257,530 | 3/1981 | Faller . | |
| 4,260,311 | 4/1981 | Hanses . | |
| 4,351,473 | 9/1982 | Manizza . | |
| 4,373,636 | 2/1983 | Hoffman . | |
| 4,398,077 | 8/1983 | Freedman et al. . | |
| 4,531,668 | 7/1985 | Forbes, Jr. . | |
| 4,676,857 | 6/1987 | Scharr et al. . | |
| 4,713,510 | 12/1987 | Quick et al. . | |
| 4,763,790 | 8/1988 | McGeehins . | |
| 4,794,005 | 12/1988 | Swiontek . | |
| 4,831,224 | 5/1989 | Keefer . | |
| 4,841,112 | 6/1989 | Peleg . | |
| 4,870,233 | 9/1989 | McDonald et al. . | |
| 4,899,882 | 2/1990 | Benner . | |
| 4,916,280 | 4/1990 | Havette . | |
| 4,917,748 | 4/1990 | Harrison . | |
| 4,939,332 | 7/1990 | Hahn . | |
| 4,955,530 | 9/1990 | Rigby et al. . | |
| 4,994,638 | 2/1991 | Icoms et al. . | |
| 5,032,213 | 7/1991 | Thomas, Jr. . | |
| 5,039,838 | 8/1991 | Woods . | |

(List continued on next page.)

FOREIGN PATENT DOCUMENTS

| | | |
|---|---|---|
| 0327243 | 8/1989 | European Pat. Off. . |
| 0399981 | 11/1990 | European Pat. Off. . |
| 0276654 | 3/1992 | European Pat. Off. . |
| 0492052 | 7/1992 | European Pat. Off. . |
| 2164868 | 8/1973 | France . |
| 2629424 | 10/1989 | France . |
| 428028 | 4/1926 | Germany . |
| 2059868 | 4/1981 | United Kingdom . |
| 2046060 | 5/1983 | United Kingdom . |
| 8604880 | 8/1986 | WIPO . |
| 8805249 | 7/1988 | WIPO . |
| 9105448 | 4/1991 | WIPO . |

*Primary Examiner*—Daniel Moon
*Assistant Examiner*—John Paradiso
*Attorney, Agent, or Firm*—David V. Radack; Eckert Seamans Cherin & Mellott, LLC

[57] ABSTRACT

A method of making a food package including a food package tray and a food package jacket. The method involves placing a food package tray on a mandrel such that the inner surface of the tray contacts at least a portion of the mandrel. After this, the food package jacket is placed on the food package tray so that the food package jacket partially surrounds the food package tray. The food package jacket is then secured to the food package tray to make the food package. An associated apparatus is also provided.

5 Claims, 4 Drawing Sheets

U.S. PATENT DOCUMENTS

| | | |
|---|---|---|
| 5,040,357 | 8/1991 | Ingemann . |
| 5,067,308 | 11/1991 | Ward ........................................ 53/250 |
| 5,090,615 | 2/1992 | Hopkins et al. . |
| 5,126,518 | 6/1992 | Beckett . |
| 5,133,169 | 7/1992 | Tesch, Jr. et al. ...................... 53/250 |
| 5,185,984 | 2/1993 | Tisma . |
| 5,234,159 | 8/1993 | Lorence et al. . |
| 5,310,977 | 5/1994 | Stenkamp et al. . |
| 5,326,575 | 7/1994 | Spaulding . |
| 5,352,465 | 10/1994 | Gondek et al. . |
| 5,356,649 | 10/1994 | LaMotta et al. . |
| 5,366,102 | 11/1994 | Bergner et al. . |
| 5,370,883 | 12/1994 | Saunier . |
| 5,428,938 | 7/1995 | Davis ....................................... 53/449 |
| 5,614,235 | 3/1997 | Gics ......................................... 53/175 |

METHOD OF MAKING A FOOD PACKAGE AND AN ASSOCIATED APPARATUS

CROSS-REFERENCE TO RELATED APPLICATION

This is a division of application Ser. No. 08/340,765, filed Nov. 16, 1994.

Which is a continuation-in-part of U.S. patent application Ser. No. 08/298,527, filed Aug. 30, 1994, entitled FOOD PACKAGE INCLUDING A FOOD PACKAGE TRAY PARTIALLY SURROUNDED BY A FOOD PACKAGE JACKET AND AN ASSOCIATED METHOD, now U.S. Pat. No. 5,492,703, the disclosure of which is expressly incorporated herein by reference.

BACKGROUND OF THE INVENTION

This invention relates to a method of making a food package and an associated apparatus, and more particularly to a method of making a food package including a food package tray surrounded by a food package jacket.

The above-cited application discloses a food package including a food package tray surrounded by a food package jacket. That food package provides an attractive package with increased surface area to print indicia, such as food product information and nutritional information. That food package avoids the problems associated with prior art food packages, most notably the food package disclosed in U.S. Pat. No. 5,090,615.

There is a need, however, to produce the food package disclosed in U.S. patent application Ser. No. 08/298,527, an automated, cost effective, efficient and speedy manner. The food packages should be able to be produced in a stand alone factory or in combination with a food filler line. The method for producing the food packages must be automated and efficient and above all, must produce enough food packages per unit time in order to minimize food packaging costs.

SUMMARY OF THE INVENTION

The invention disclosed herein has met the above needs. The method of the invention comprises providing a food package tray having a base and a sidewall extending from the base. The base has an outer surface and an inner surface opposite the outer surface. A food package jacket is also provided which includes a bottom flap and at least one side flap extending from the bottom flap. The method further comprises placing the food package tray on a support means such that a portion of the inner surface of the base contacts at least a portion of the support means and then placing the food package jacket on the food package tray such that the food package jacket partially surrounds the food package tray. The method then comprises securing the food package jacket to the food package tray to make the food package.

The apparatus of the invention comprises a first denester means for holding a plurality of nested food package trays and denesting an individual food package tray from the plurality of nested food package trays and a second denester means for holding a plurality of nested food package jackets and denesting an individual food package jacket from the plurality of nested food package jackets. Movable support means operatively associated with the first and second denester means are provided which includes a movable belt and a plurality of individual mandrels mounted thereto. The mandrels are adapted to receive the food package trays. The apparatus also comprises means operatively associated with the movable support means for securing the food package jackets to the food package trays.

BRIEF DESCRIPTION OF THE DRAWINGS

A full understanding of the invention can be gained from the following description of the preferred embodiment when read in conjunction with the accompanying drawings in which.

DETAILED DESCRIPTION

The food package that is made by the method and apparatus of the invention is disclosed in U.S. patent application Ser. No. 08/298,527, which is specifically incorporated by reference herein. The food package consists of a food package tray, preferably made of plastic such as crystallized polyethylene terephthalate or C-PETE partially surrounded by a food package jacket made of paperboard. The food package is adapted to hold food products, such as "eat-out-of-box" frozen entrées and desserts. As disclosed in U.S. patent application Ser. No. 08/298,527, the food package tray has a base and sidewall extending from the base. The base can be of any shape or size, and includes an outer surface and an inner surface opposite from the outer surface. The food package jacket has a bottom flap and at least one side flap extending from the bottom flap. The side flap of the food package jacket is secured to the sidewall of the food package tray so that the food package jacket partially surrounds the food package tray. The food package jacket provides space for the printing of indicia, such as food product identification indicia or nutritional information indicia.

Figure 1:
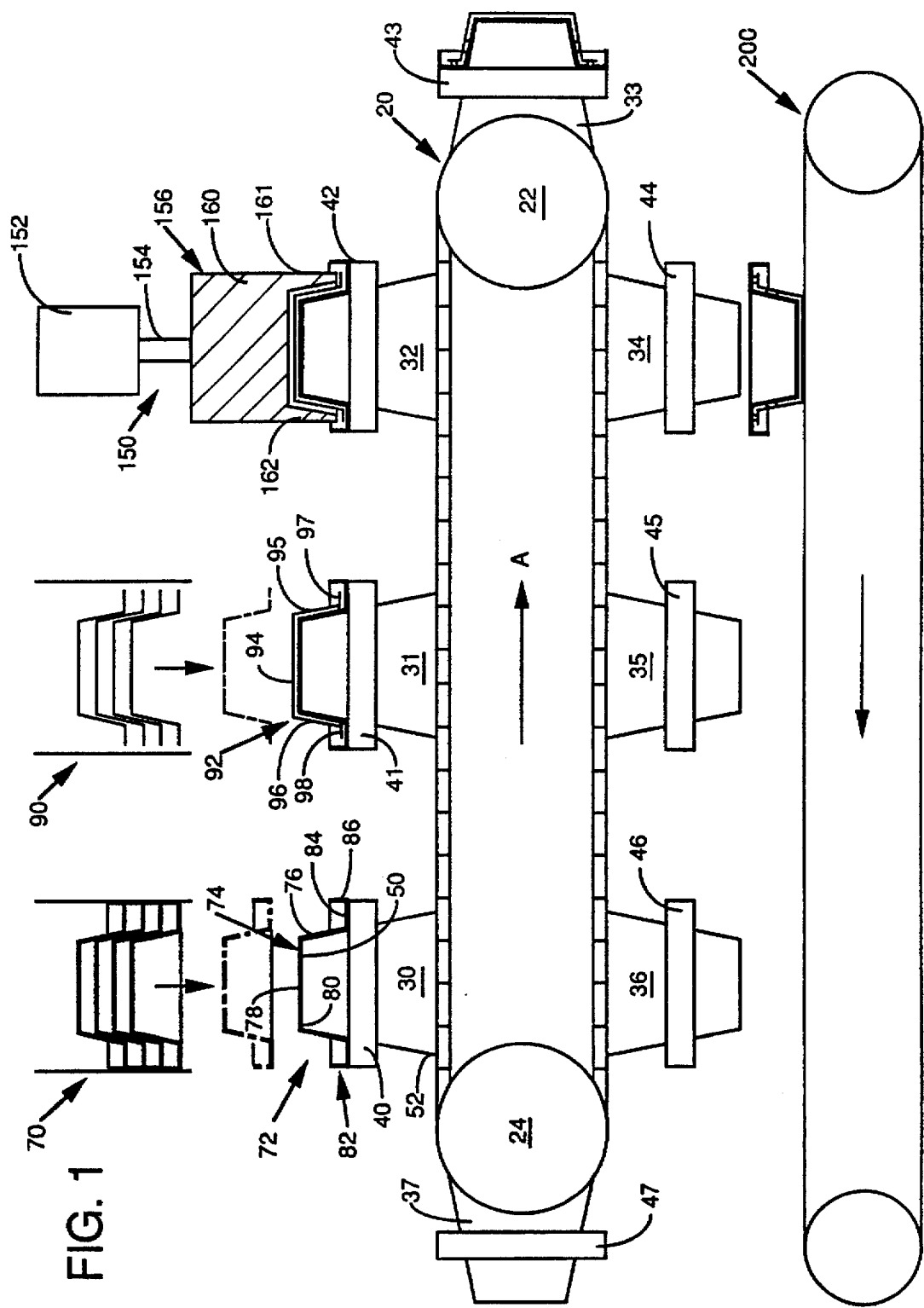
FIG. 1 is a cross-sectional view showing the apparatus used to make the food package of the invention.

Referring now to FIG. 1, an apparatus is shown for making the above described food package. The apparatus consists of a movable support means such as an endless belt 20 driven by a drive roller 22 over an idler roller 24. Mounted on the belt 20 are a plurality of mandrels 30, 31, 32, 33, 34, 35, 36 and 37. The mandrels 30–37 are made of steel and can move in the direction of the belt portion that they are attached to, but are shown in FIG. 1 as moving in the direction of Arrow A. The mandrels each include a sleeve 40, 41, 42, 43, 44, 45, 46 and 47 whose purpose will be explained hereinbelow.

Figure 2:
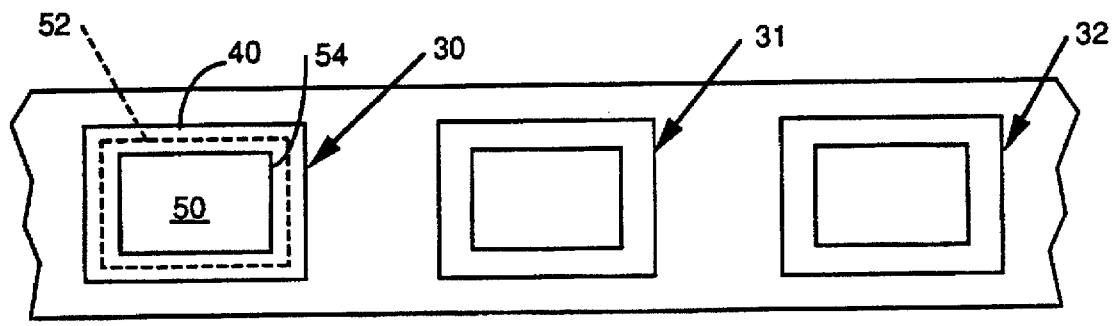
FIG. 2 is a top plan view of the movable support belt having mounted thereon the mandrels.

The shape of the mandrel is dictated by the shape of the food package that is desired to be made. In this case, (as can be seen in FIGS. 1 and 2) the mandrel, such as mandrel 30, has a generally square exposed surface 50 that tapers outwardly to a base 52 which is mounted on the belt 20. As can also be seen in FIG. 2, the sleeve 40 of the mandrel circumscribes the outer surface 54 thereof to provide a continuous sleeve around the mandrel.

Referring back again to FIG. 1, the apparatus also includes a first denesting means 70 for holding a plurality of food package trays such as food package tray 72 shown resting on mandrel 30. The food package trays are preferably made of crystallized polyethylene terephthalate ("C-PETE"). The structure of food package tray 72 was discussed in detail in U.S. patent application Ser. No. 08/298,527, but as can be seen in FIG. 1, includes a base 74 and a sidewall 76 extending from the base. The base 74 has an outer surface 78 an inner surface 80. It will be appreciated that as referred to herein, the outer surface 78 is that surface which is exposed and the inner surface 80 is that surface on which the food product rests when the food product is placed into the food package tray 72. The sidewall 76 includes a flange 82 having a first section 84 extending generally perpendicularly from the sidewall 76 and a second section 86 extending generally perpendicularly from the first section 84.

The food package trays 72 are designed such that a plurality of them may be disposed in a nested relationship. The nested food package trays are subsequently loaded into the denesting means 70. Denesting means 70 is a known apparatus that is readily commercial available. The denesting means 70 denests an individual food package tray, such as food package tray 72, and drops it on the mandrel 30, as is shown by the phantom line drawing in FIG. 1. The denesting means 70 is operatively associated with the belt 20 by means of an indexer (known to those skilled in the art) which times the drop of the food package tray onto the mandrel 30.

The food package tray 72 is dropped onto the mandrel 30 such that the inner surface 80 is in contact with the exposed surface 50 of the mandrel 30. The food package tray sidewall conforms to and surrounds the upper portion of the mandrel 30 and is also supported thereby. Finally, the sleeve 40 of the mandrel is in contact with the first section 84 of the flange 82 of the sidewall 76.

The apparatus then comprises a second denesting means 90, also which is a known apparatus that is commercially available, which holds a plurality of nested food package jackets, such as food package jacket 92. Food package jackets are preferably made of paperboard. Food package jacket 92 is described in detail in U.S. patent application Ser. No. 08/298,527, but includes a bottom flap 94, a first side flap 95 and a second side flap 96. First side flap 95 includes an arm section 97 which extends generally perpendicularly from side flap 95. The second side flap 96 includes an arm section 98 which extends generally perpendicularly from the side flap 96. The food package jacket 92 is designed to be secured to the sidewall 76 of the food package tray 72 in such a manner as to partially surround the food package tray 72. The second denesting means 90 is also operatively associated with the belt 20 to deposit a denested food package jacket, such as food package jacket 92 onto the food package tray 72 as shown by the phantom line drawing in FIG. 1.

Figure 3A:
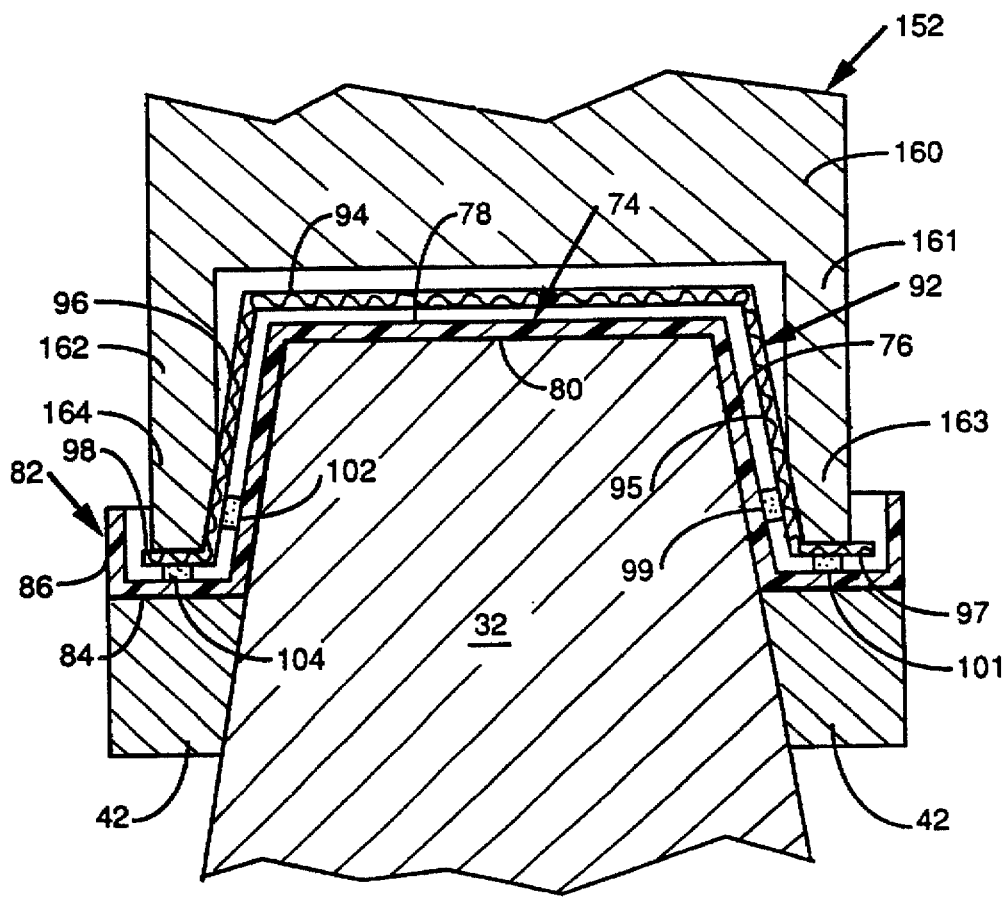
FIG. 3A is a detailed cross-sectional view of the heat seal die securing the food package jacket to the food package tray.

Referring to FIG. 3A, the side flap 95 of the food package jacket 92 has disposed thereon a heat activated adhesive 99 and the arm section 97 also includes a heat activated adhesive 101. The side flap 96 of the food package jacket 92 has disposed thereon a heat activated adhesive 102 and the arm section 98 also includes a heat activated adhesive 104. The adhesives are used to secure the food package jacket 92 to the sidewall 76 of the food package tray 72, as will be discussed below.

Referring back to FIG. 1, the apparatus further comprises a hydraulically operated heat seal die means 150 including a base 152, an hydraulic cylinder 154 and a movable heated die 156. The die 156 includes a base portion 160 and heat sealing portions 161 and 162. Referring particularly to FIG. 3A, the heat sealing portions 161 and 162 each have respective sections 163 and 164 which are forced into contact with portions of side flaps 95 and 96 to melt the adhesives 99 and 102 and are similarly forced into contact with portions of the arm sections 97 and 98 to melt adhesives 101 and 104. The heat sealing portions apply heat through the side flaps and arm sections to melt the respective adhesives and thus secure the food package jacket to the food package tray.

Figure 3B:
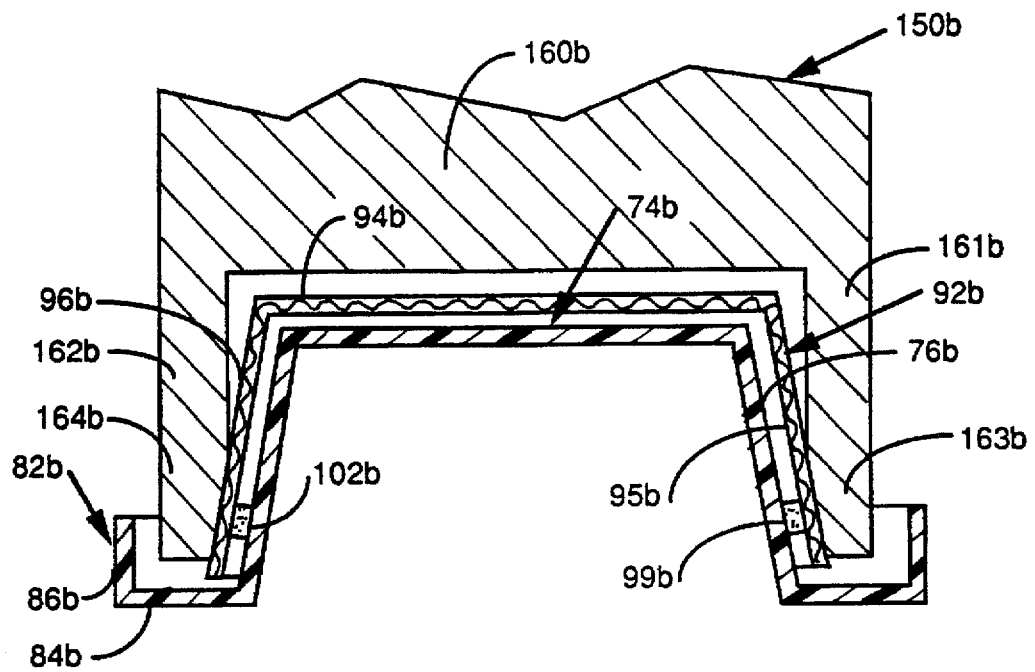
FIG. 3B is a partial, detailed cross-sectional view of a different heat seal die securing another embodiment of a food package jacket to the food package tray.

It will be appreciated that although a food package tray having a flange 82 with a first section 84 and a second section 86, along with a food package jacket 92 having an arm section 98 is shown, that the invention is not limited to these configurations. Referring to FIG. 3B, a food package jacket 92b is shown as having only side flaps 95b and 96b. Adhesive 99b is disposed on the side flap 95b to secure it to he sidewall 76b of the food package tray. Adhesive 102b is disposed on the side flap 96b to secure it to the sidewall 76b of the food package tray. The heat seal die means 150b includes a base section 160b and heat sealing portions 161b and 162b. The heat sealing portions 161b and 162b each have sections 163b and 164b which are forced into contact with the portion of the side flaps 95b and 96b that contain the adhesive 99b and 102b. Sections 163b and 164b apply heat through the side flap 95b and 96b to melt the adhesives 99b and 102b and thus secure the side flap 95b and 96b to the sidewall 76b as can be seen in FIG. 3B.

Figure 3C:
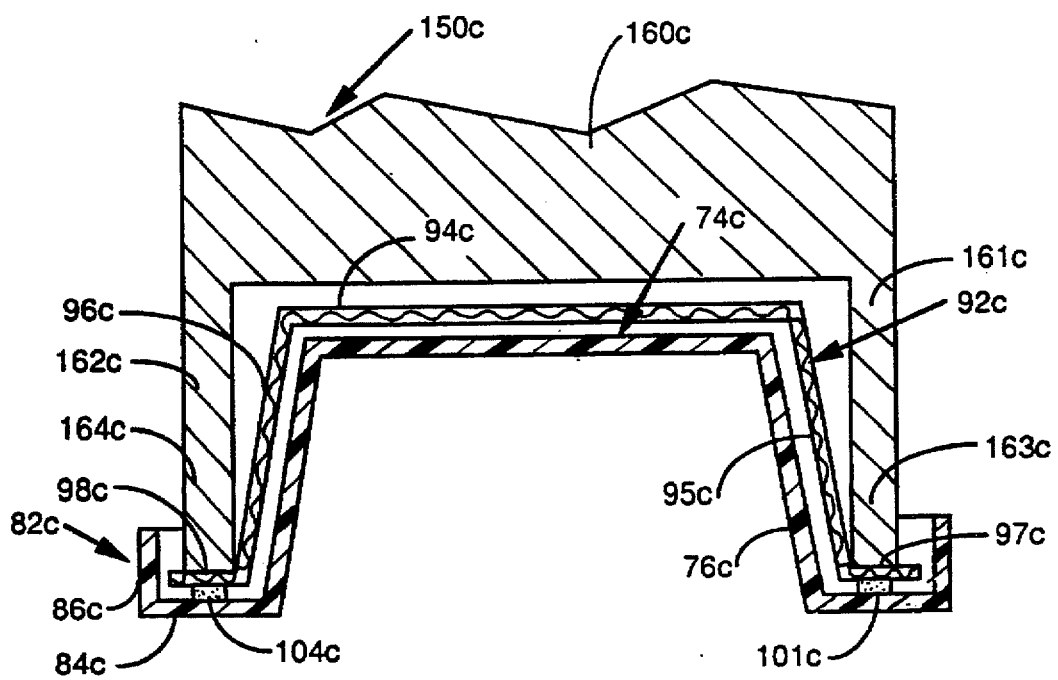
FIG. 3C is a partial, detailed cross-sectional view of yet another heat seal die securing yet another embodiment of a food package jacket to the food package tray.

Referring further to FIG. 3C, yet another embodiment is shown wherein the food jacket 92c is shown having side flaps 95c and 96c and arm sections 97c and 98c. Unlike the embodiment in FIG. 3A, however, this embodiment shows only adhesives 101c and 104c which are disposed on the arm sections 97c and 98c. The heat seal die means 150c includes a base section 160c and heat sealing portions 161c and 162c. The heat sealing portions 161c and 162c have sections 163c and 164c which are forced into contact with the portions of the arm section 97c and 98c that contains the adhesives 101c and 104c. Sections 163c and 164c apply heat through the side flaps 95c and 96c to melt the adhesives 101c and 104c and thus secure the side flaps 95c and 96c to the sidewall 76c as can be seen in FIG. 3C.

Figure 4:
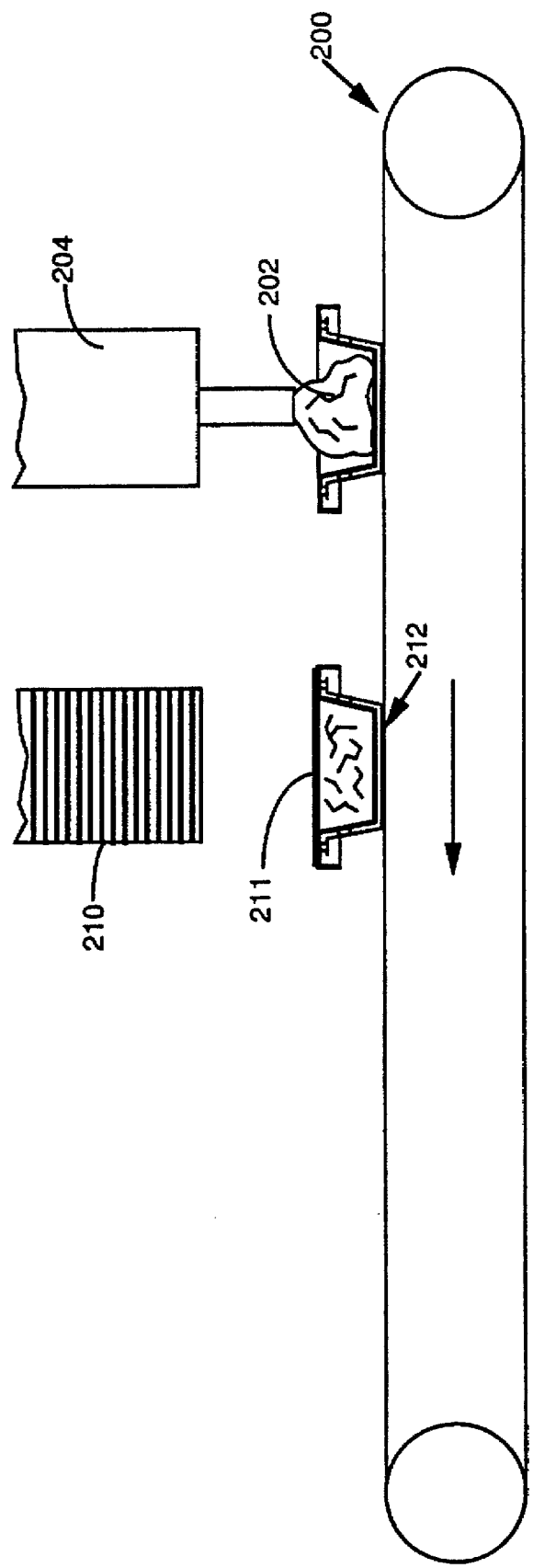
FIG. 4 is a cross-sectional view showing the food filling and lidding apparatus.

Referring back to FIG. 1, the completed food package is then dropped from the mandrel onto another endless belt means 200 for further processing. Referring now to FIG. 4, the food package is first filled with a food product 202 deposited from reservoir 204 and then is lidded by food lidding apparatus 210 which drops a lid, such as lid 211 on the food package tray. The lid is secured by known methods, such as using a heat seal die. It will be appreciated, however, that the construction of the food package allows for more efficient lidding of the product as was explained in U.S. patent application Ser. No. 08/298,527 and U.S. patent application Ser. No. 08/285,369, the disclosure of which is expressly incorporated herein by reference and U.S. patent application (Attorney Docket No. 120693-19). The final, lidded food product 212 is then sent down the line for packing in shipping containers for shipment to food retailers, for example.

The method of the invention involves, providing a food package tray 72 having a base 74 and a sidewall 76 extending from the base 74, the base having an outer surface 78 and an inner surface 80 opposite the outer surface and further providing a food package jacket 92 having a bottom flap 94 and at least one side flap 96 extending from the bottom flap. The food package tray 72 is placed on the mandrel 30 such that a portion of the inner surface 80 of the base 74 of the food package tray 72 contacts at least a portion of the mandrel 30. The food package jacket 92 is then placed on the food package tray 72 such that the food package jacket 92 partially surrounds the food package tray 72. After this, the food package jacket 92 is secured to the food package tray 72 to make the food package.

It will be appreciated that a food package including a food package tray partially surrounded by a food package jacket and an associated method is provided. The method and apparatus provide an efficient, cost effective, accurate and quick way to produce a food package having a food package tray and a food package sleeve surrounding the tray.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An apparatus for making a food package comprising:

first denester means for (i) holding a plurality of nested food package trays and (ii) denesting an individual food package tray from said plurality of nested food package trays;

second denester means for (i) holding a plurality of nested food package jackets and (ii) denesting an individual food package jacket from said plurality of nested food package jackets;

movable support means disposed beneath said first and second denester means said support means including a movable belt and a plurality of individual mandrels mounted to said movable belt, said mandrels receiving a said food package tray from said first denester means and then said mandrel holding said food package tray being moved underneath said second denester means so that a said food packet jacket is denested and then received on said food package tray; and means operatively associated with said movable support means for securing said food package jackets to said food package trays to produce a said food package that is ready for subsequent filling with a food product.

2. The apparatus of claim 1, including said food package tray includes a base and a sidewall extending from said base;

said food package jacket includes a bottom flap and at least one side flap extending from said bottom flap, said side flap having a heat activated adhesive disposed on a portion thereof; and said securing means is a heat seal die means constructed and arranged to press said side flap against said sidewall while substantially simultaneously melting said heat activated adhesive such that said side flap is secured to said sidewall.

3. The apparatus of claim 2, wherein said sidewall includes a flange extending generally perpendicularly therefrom; and said side flap includes an arm section extending generally perpendicularly therefrom, said arm section has a heat activated adhesive disposed thereon; and said mandrel includes a sleeve extending therefrom which facilitates said heat seal die means pressing said arm section against said flange and melting said heat activated adhesive to secure said arm section to said flange.

4. The apparatus of claim 1, wherein said movable belt is an endless belt.

5. The apparatus of claim 1, including food package filling means for introducing said food product into said food package tray, and food package lidding means for securing a lid on said food package after said food package tray has been filled with said food product.

* * * * *